（12）United States Patent
Varanasi et al.

(10) Patent No.: US 11,718,070 B2
(45) Date of Patent: Aug. 8, 2023

(54) LAMINATED WINDOW ASSEMBLY

(71) Applicant: PILKINGTON GROUP LIMITED, Lathom (GB)

(72) Inventors: Srikanth Varanasi, Ottawa Hills, OH (US); David Lawrence Bamber, Preston (GB); Shannon Jurca, Perrysburg, OH (US); David Alan Strickler, Toledo, OH (US)

(73) Assignee: Pilkington Group Limited, Lathom (GB)

( * ) Notice: Subject to any disclaimer, the term of this patent is extended or adjusted under 35 U.S.C. 154(b) by 0 days.

(21) Appl. No.: 17/611,275

(22) PCT Filed: May 20, 2020

(86) PCT No.: PCT/GB2020/051235
§ 371 (c)(1),
(2) Date: Nov. 15, 2021

(87) PCT Pub. No.: WO2020/234593
PCT Pub. Date: Nov. 26, 2020

(65) Prior Publication Data
US 2022/0234334 A1 Jul. 28, 2022

Related U.S. Application Data

(60) Provisional application No. 62/850,220, filed on May 20, 2019.

(51) Int. Cl.
*B32B 17/10* (2006.01)
*C03C 17/34* (2006.01)

(52) U.S. Cl.
CPC .. *B32B 17/10211* (2013.01); *B32B 17/10036* (2013.01); *B32B 17/10449* (2013.01);
(Continued)

(58) Field of Classification Search
CPC ....... B32B 17/00–17/1099; G02B 5/28–5/282; G02B 5/285–286
See application file for complete search history.

(56) References Cited

U.S. PATENT DOCUMENTS 3,514,175 A 5/1970 Jenkins
4,806,220 A 2/1989 Finley
(Continued)

FOREIGN PATENT DOCUMENTS

CN 106019424 A 10/2016
EP 1858698 A1 11/2007
(Continued)

OTHER PUBLICATIONS

European Patent Office, International Search Report with Written Opinion, issued in PCT/GB2020/051235, dated Jul. 14, 2020, 12 pages, European Patent Office, Rijswijk, Netherlands.

*Primary Examiner* — Prashant J Khatri
(74) *Attorney, Agent, or Firm* — Marshall & Melhorn, LLC

(57) ABSTRACT

A laminated window assembly has a first glass pane with a coating formed thereon, a second glass pane, and a polymeric interlayer provided between the first glass pane and the second glass pane. The coating includes a first layer deposited over a major surface of the glass pane, wherein the first layer has a refractive index of 1.6 or more and a thickness of 50 nm or less, a second layer deposited over the first layer, wherein the second layer has a refractive index that is less than the refractive index of the first layer and a thickness of 50 nm or less, a third layer deposited over the second layer, wherein the third layer has a refractive index that is greater than the refractive index of the second layer and a thickness of less than 500 nm, and a fourth layer deposited over the third layer, wherein the fourth layer has
(Continued)

a refractive index that is less than the refractive index of the third layer and a thickness of 100 nm or less.

20 Claims, 5 Drawing Sheets

(52) U.S. Cl.
 CPC ...... *C03C 17/3417* (2013.01); *B32B 2255/20* (2013.01); *B32B 2255/28* (2013.01); *B32B 2307/416* (2013.01); *B32B 2307/418* (2013.01); *B32B 2315/08* (2013.01); *B32B 2605/006* (2013.01); *B32B 2605/08* (2013.01); *C03C 2217/734* (2013.01)

(56) References Cited

U.S. PATENT DOCUMENTS

| | | | |
|---|---|---|---|
| 6,538,192 | B1 | 3/2003 | Coster et al. |
| 6,924,037 | B1 | 8/2005 | Joret et al. |
| 7,887,921 | B2 | 2/2011 | Varanasi et al. |
| 7,943,246 | B2 | 5/2011 | Barton et al. |
| 8,137,814 | B2 | 3/2012 | Barton et al. |
| 8,632,886 | B2 | 1/2014 | Barton et al. |
| 9,517,970 | B2 | 12/2016 | Tixhon et al. |
| 9,957,194 | B2 | 5/2018 | Soubeyrand et al. |
| 10,550,032 | B2 | 2/2020 | Sanderson et al. |
| 11,124,447 | B2 | 9/2021 | Varanasi |
| 2006/0188730 | A1* | 8/2006 | Varanasi ............. C03C 17/3452 428/432 |

FOREIGN PATENT DOCUMENTS

| | | |
|---|---|---|
| EP | 2711175 A1 | 3/2014 |
| EP | 2714608 A1 | 4/2014 |
| FR | 2664260 A1 | 1/1992 |
| WO | WO/2005007592 A2 | 1/2005 |
| WO | WO/2012134821 A2 | 10/2012 |
| WO | WO/2015150820 A1 | 10/2015 |

* cited by examiner

LAMINATED WINDOW ASSEMBLY

BACKGROUND OF THE INVENTION

The invention relates to a window assembly. More particularly, the invention also relates to a laminated window assembly for a vehicle.

The windows of a vehicle are a prominent feature in the overall design of the vehicle. Increasingly, there is interest in reducing the solar gain into the vehicle that occurs in hot weather and reducing the heat lost from the vehicle that occurs in cold weather. Also, there is interest in maintaining or improving the visual comfort of the passengers by reducing the visible light transmittance into the passenger cabin of the vehicle. Also, it may be desirable to reduce reflections from a window, which can impact the visual comfort of the passengers. However, when coatings are added to glass to form a window for a vehicle, the visible light reflectance inside the passenger cabin can increase.

It would be desirable to provide a window suitable for a vehicle that enables passenger comfort and has a low visible light transmittance, low visible light reflectance, and/or a desired appearance.

BRIEF DESCRIPTION OF THE DRAWINGS

The above, as well as other advantages of the present invention will become readily apparent to those skilled in the art from the following detailed description when considered in the light of the accompanying drawings in which.

DETAILED DESCRIPTION OF THE INVENTION

Figure 1:
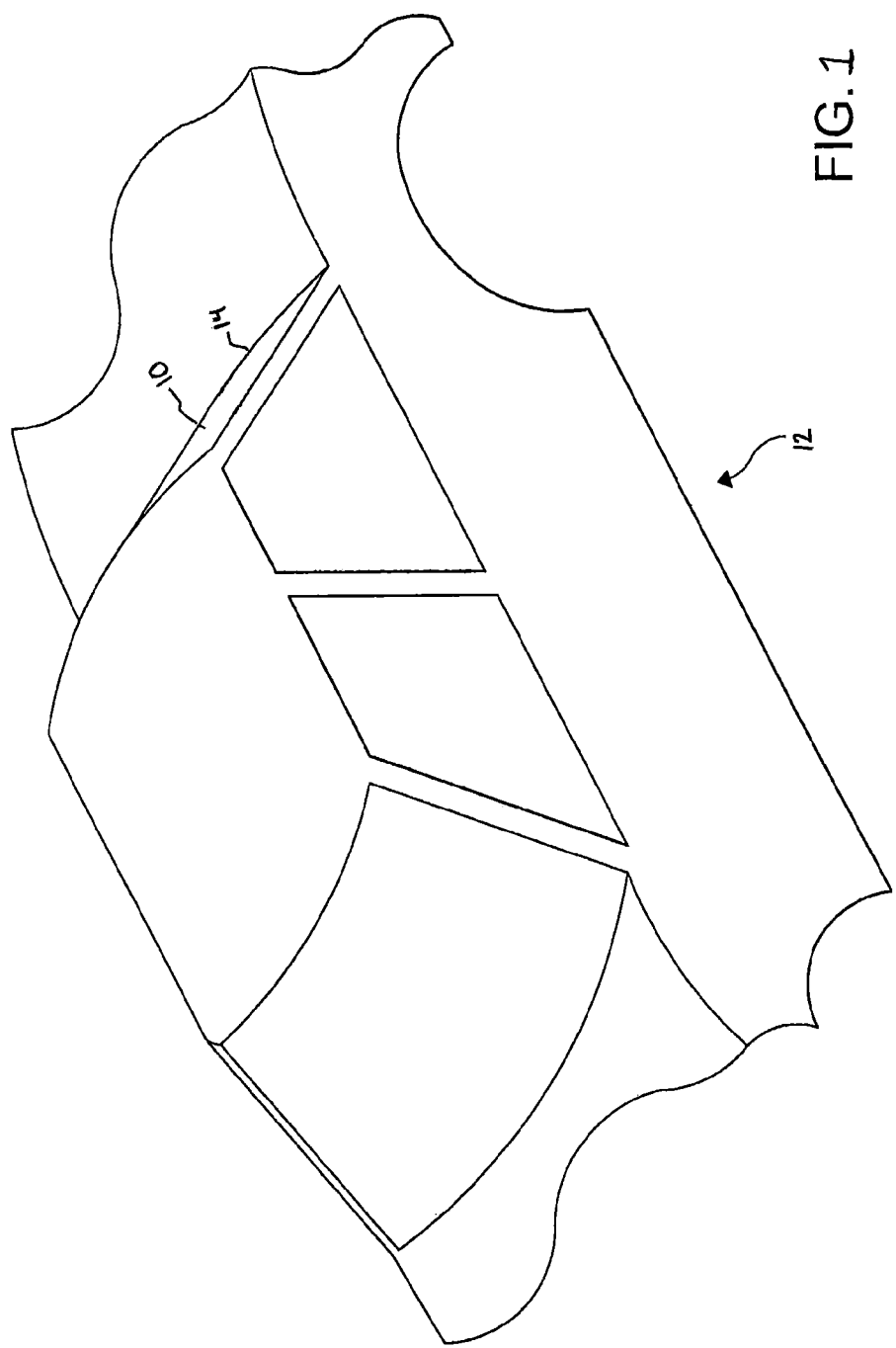
FIG. 1 is a partial perspective view of a vehicle depicting embodiments of a laminated window assembly in accordance with the invention.

It is to be understood that the invention may assume various alternative orientations and step sequences, except where expressly specified to the contrary. It is also to be understood that the specific articles, assemblies and features illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

According to a first aspect the present invention provides a laminated window assembly, comprising:

a first glass pane having a coating formed thereon, wherein the coating includes i. a first layer deposited over a major surface of the glass pane, wherein the first layer has a refractive index of 1.6 or more and a thickness of 50 nm or less, ii. a second layer deposited over the first layer, wherein the second layer has a refractive index that is less than the refractive index of the first layer and a thickness of 50 nm or less, iii. a third layer deposited over the second layer, wherein the third layer has a refractive index that is greater than the refractive index of the second layer and a thickness of less than 500 nm, iv. a fourth layer deposited over the third layer, wherein the fourth layer has a refractive index that is less than the refractive index of the third layer and a thickness of 100 nm or less;

a second glass pane; and a polymeric interlayer provided between the first glass pane and the second glass pane.

An embodiment of a laminated window assembly 10 is illustrated in FIG. 1. The laminated window assembly 10 may be utilized as a glazing for a vehicle 12. It would be understood by one of ordinary skill in the art that the window assembly described herein may have applications to on-highway and off-highway vehicles. Also, the coated glass article could be utilized in a commercial or residential glazing or have, for example, architectural, photovoltaic, industrial, locomotive, naval, and aerospace applications.

When the laminated window assembly 10 is utilized in a vehicle 12, the assembly 10 may be installed in an appropriate body opening 14 of the vehicle 12. In some embodiments, the laminated window assembly 10 is a windshield, side window, or rear window of the vehicle. In other embodiments (not depicted), the laminated window assembly 10 could be utilized in another body opening in the vehicle. For example, the laminated window assembly 10 could be installed in an opening in the roof of the vehicle. In this embodiment, the laminated window assembly 10 may be utilized as a roof glazing in a sunroof or moonroof application.

Figure 2:
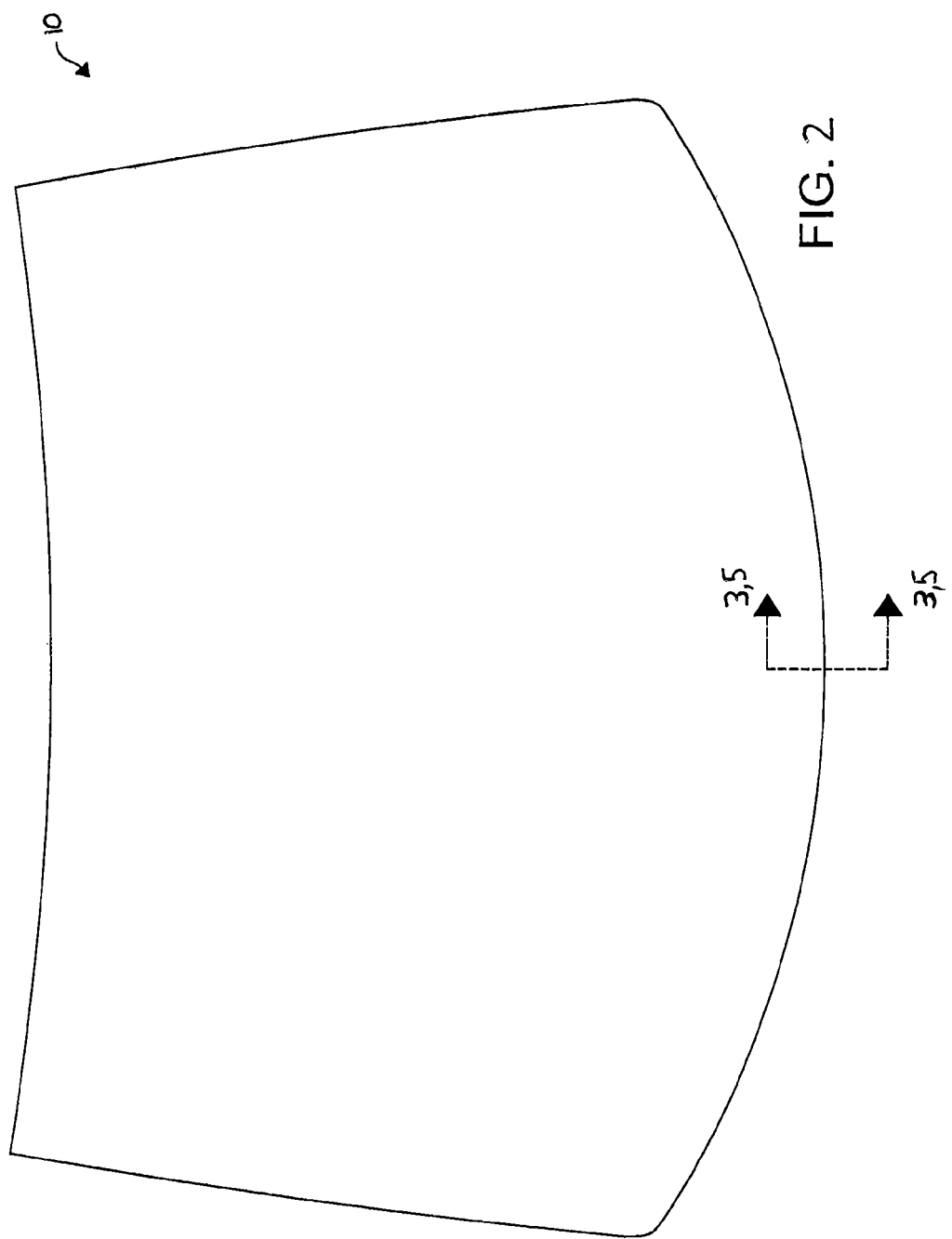
FIG. 2 is a partial front view of the laminated window assembly of FIG. 1
Figure 3:
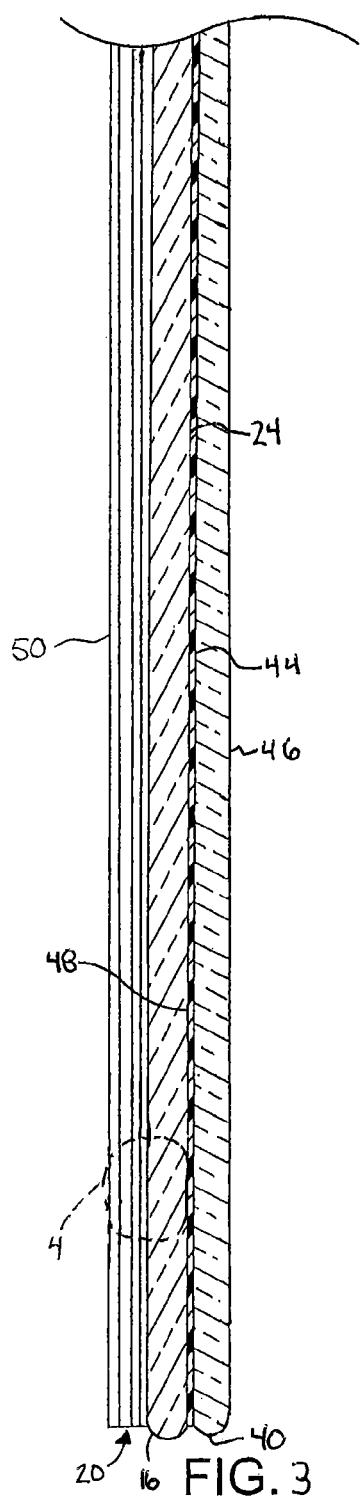
FIG. 3 is a cross-sectional view of an embodiment of a portion of the laminated window assembly of FIG. 2 along line 3-3.
Figure 4:
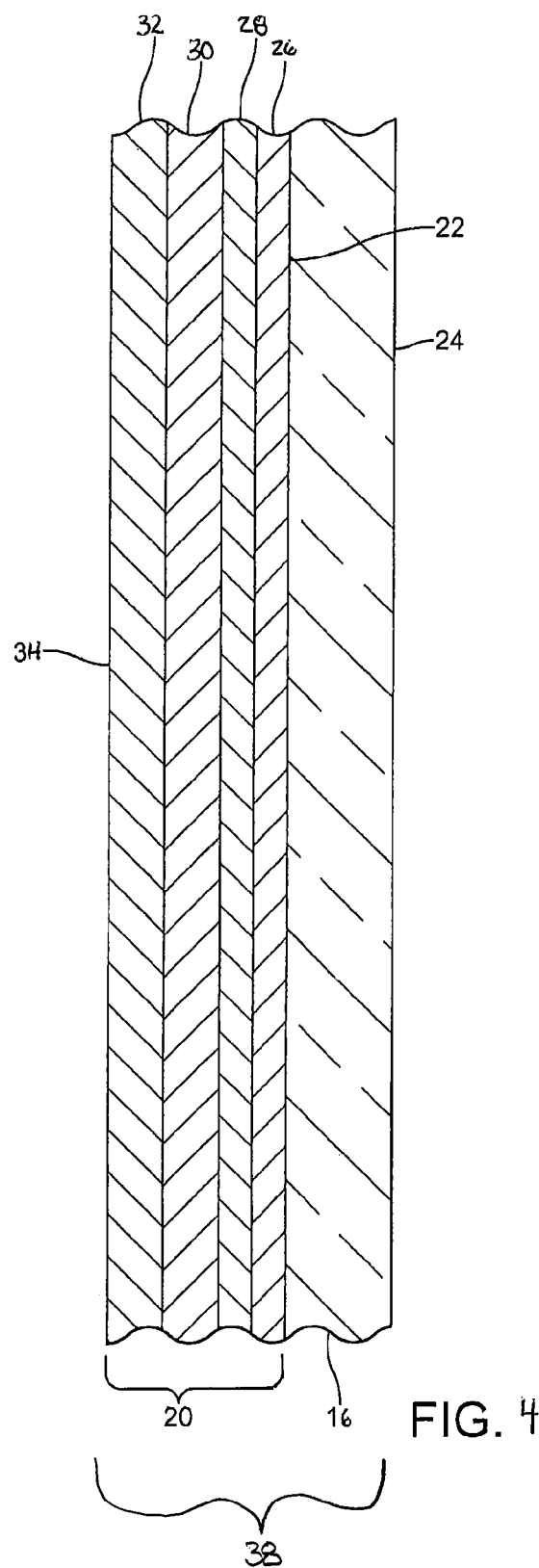
FIG. 4 is an enlarged view of a portion of FIG. 3.

Referring now to FIGS. 2-4, the laminated window assembly 10 comprises a first glass pane 16. In some embodiments, the first glass pane 16 is not limited to a particular thickness. However, in certain embodiments, the first glass pane 16 may have a thickness of 20.0 millimeters (mm) or less. Preferably, the first glass pane 16 has a thickness of 0.5-20.0 mm. In some embodiments, the first glass pane 16 may have a thickness of 0.5-10.0 mm. More preferably, the first glass pane 16 has a thickness of 0.5-5.0 mm. In some embodiments, the first glass pane 16 has a thickness of 1.5-5.0 mm.

The first glass pane 16 may be of any of the conventional glass compositions known in the art. Preferably, the first glass pane 16 is a soda-lime-silica glass. When the first glass pane 16 is a soda-lime-silica glass, the first glass pane 16 may comprise 68-74 weight % $SiO_2$, 0-3 weight % $Al_2O_3$, 0-6 weight % MgO, 5-14 weight % CaO, 10-16 weight % $Na_2O$, 0-2 weight % $SO_3$, 0.005-4.0 weight % $Fe_2O_3$ (total iron), and 0-5 weight % $K_2O$. As used herein, the phrase "total iron" refers to the total weight of iron oxide (FeO+$Fe_2O_3$) contained in the glass calculated as $Fe_2O_3$. The glass may also contain other additives, for example, refining agents, which would normally be present in an amount of up to 2%. In this embodiment, the first glass pane 16 may be provided as a portion of float glass ribbon. When the first glass pane 16 is formed as a portion of a float glass ribbon, the first glass pane 16 may be clear float glass. In some of these embodiments, clear float glass may mean a glass having a composition as defined in a related standard such as BS EN 572-1:2012+A1:2016 and BS EN 572-2:2012.

However, the first glass pane 16 may be of another composition such as, for example, a borosilicate or an aluminosilicate composition.

The color of the first glass pane 16 can vary between embodiments of the laminated window assembly 10. In some embodiments, the first glass pane 16 may be clear. In these embodiments, the first glass pane 16 may exhibit a total visible light transmittance of 88% or more when measured at a reference thickness of 2.1 mm in the CIELAB color scale system (Illuminant C, 10 degree observer). In one such embodiment, the inner pane of glass 16 has a low iron content, which allows for the high visible light transmittance. For example, the first pane of glass 16 may comprise 0.20 weight % $Fe_2O_3$ (total iron) or less. More preferably, in this embodiment, the first pane of glass 16 comprises 0.1 weight % $Fe_2O_3$ (total iron) or less, and, even more preferably, a 0.02 weight % $Fe_2O_3$ (total iron) or less. In still other embodiments, the first glass pane 16 may be tinted or colored.

When the first glass pane 16 is tinted, the first glass pane 16 may comprise 0.1-4.0 weight % $Fe_2O_3$ (total iron). Preferably, when the first glass pane 16 is tinted, the first glass pane 16 comprises 0.5-4.0 weight % $Fe_2O_3$ (total iron). In some of these embodiments, the first glass pane 16 may comprise 0.05-1.6 by weight of ferrous oxide (calculated as FeO). Further, when the first glass pane 16 is tinted, the first glass pane 16 may comprise certain colorants. For example, the first glass pane 16 may comprise one or more of cobalt oxide (calculated as $Co_3O_4$) in an amount up to 600 ppm by weight of glass, nickel oxide (calculated as NiO) in an amount up to 500 ppm by weight of glass, and selenium in an amount up to 50 ppm by weight of glass. In an embodiment, the first glass pane 16 comprises nickel oxide (calculated as NiO) of 100-500 ppm. When the first pane of glass 16 is tinted, it is preferred that the first pane of glass 16 is of, for example, a grey, grey-blue, green, blue-green, or bronze color.

When the first glass pane 16 is of a grey color, the first glass pane 16 may comprise 0.1-4.0 weight % $Fe_2O_3$ (total iron). Preferably, when the first glass pane 16 is of a grey color, the first glass pane 16 comprises 1.2-3.0 weight % $Fe_2O_3$ (total iron). Also, in these embodiments, the first glass pane 16 may have an a* value of −5±5, preferably −4±3, a b* value of 0±10, preferably 4±1 and an L* of 50±10, preferably 50±5 in the CIELAB color scale system. In these embodiments, the grey glass has a visible light transmission of 50% or less when the first glass pane 16 has a nominal thickness of 6 mm. Preferably, the grey glass has a visible light transmission of 7-11% when the first glass pane 16 has a nominal thickness of 6 mm. The grey glass pane may be sold under the trademark Galaxsee and manufactured by Pilkington. In other embodiments, the first glass pane 16 may be a grey glass having similar optical properties to Galaxsee by Pilkington or a grey glass having lower light transmission properties than Galaxsee by Pilkington at a nominal thickness.

When the first glass pane 16 is of a green color, the first glass pane 16 may comprise 0.2-2.0 weight % $Fe_2O_3$ (total iron). In some embodiments, when the first glass pane 16 is of a green color, the first glass pane 16 comprises 0.3-1.2 weight % $Fe_2O_3$ (total iron). In other embodiments where the first glass pane 16 is of a green color, the first glass pane 16 may comprise greater than 1.2 weight % $Fe_2O_3$ (total iron). Also, in these embodiments, the first glass pane 16 may comprise 0-2.0% $TiO_2$. In some embodiments, the first glass pane 16 may have an a* value of −11 to −1, a b* value of −2 to 8, and an L* of 60 or more in the CIELAB color scale system. In these embodiments, the green glass has a visible light transmission of 50% or more when the first glass pane 16 has a nominal thickness of 6 mm.

A coating 20 is formed on the first glass pane 16. In some embodiments, the coating 20 and the first glass pane 16 define a coated glass article 38. Advantageously, the properties of the coated glass article 38 enable the laminated window assembly 10 to exhibit certain desired properties.

Preferably, the coating 20 is formed on a first major surface 22 of the first glass pane 16. When the coating 20 is formed directly on the first glass pane 16, there are no intervening coatings between the coating 20 and the first glass pane 16. Preferably, a second major surface 24 of the first glass pane 16 and an opposite side of the coated glass article 38 is uncoated. It is preferred that the first major surface 22 and the coating 20 face into the passenger cabin of the vehicle 12.

The coating 20 comprises four or more layers 26-32. In an embodiment, the coating 20 comprises a first layer 26, second layer 28, third layer 30, and fourth layer 32. In some embodiments, the coating 20 may consist of the four coating layers 26-32. The coating 20 may be configured to reduce the visible light reflection exhibited by the first glass pane 16.

In an embodiment, the coating 20 is pyrolytic. As used herein, the term "pyrolytic" may refer to the coating or a layer thereof being chemically bonded to the glass pane or another layer. The coating 20 and one or more of its layers 26-32 may be formed in conjunction with the manufacture of the first glass pane 16. Preferably, in these embodiments, the first glass pane 16 is formed utilizing the well-known float glass manufacturing process. In embodiments where the first glass pane 16 is formed from a portion of a float glass ribbon, the coating 20 or one or more of its layers 26-32 may be formed in the heated zone of the float glass manufacturing process.

The coating layers 26-32 may be deposited by any suitable method. However, in some embodiments, at least one layer 26-32 is deposited by atmospheric pressure chemical vapor deposition (APCVD). In these embodiments, one or more layers 26-32 may be deposited by another known deposition method such as, for example, a sol-gel technique or a sputter technique.

The first layer 26 is deposited over the first glass pane 16. More particularly, the first layer 26 is deposited over the first major surface 22 of the first glass pane 16. In an embodiment, the first layer 26 is deposited directly on the first major surface 22 of the first glass pane 16. When the first layer 26 is deposited directly on the first major surface 22 of the first glass pane 16, there are no intervening layers between the first layer 26 and the first major surface 22 of the first glass pane 16.

In certain embodiments, the refractive index of the first layer 26 is 1.8 or more. In one such embodiment, the refractive index of the first layer 26 is between 1.8 and 2.4. Preferably, the refractive index of the first layer 26 is between 1.8 and 2.0. It should be noted that the refractive index values described herein are reported as an average value across 400-780 nm of the electromagnetic spectrum.

Preferably, the first layer 26 is pyrolytic. In certain embodiments, the first layer 26 comprises an inorganic metal oxide. In some embodiments, the first layer 26 comprises tin oxide ($SnO_2$) or another transparent inorganic metal oxide. When the first layer 26 comprises tin oxide, it is preferred that the first layer 26 comprises tin and oxygen. However, in these embodiments, the first layer 26 may also comprise other constituents including a trace amount or more of other elements such as, for example, carbon. As used herein, the phrase "trace amount" is an amount of a constituent of a coating layer that is not always quantitatively determinable because of its minuteness. In some embodiments, the first layer 26 may consist essentially of, preferably consist of, tin oxide.

The first layer 26 has a thickness of 50 nanometers (nm) or less. Preferably, the thickness of the first layer 26 is 35 nm or less. In certain embodiments, the thickness of the first layer 26 is preferably 10-35 nm, more preferably 15-30 nm, even more preferably 20-30 nm. These preferred thicknesses assist in controlling the color of the laminated window assembly to an aesthetically acceptable degree.

The second layer 28 is deposited over, and preferably, directly on, the first layer 26. Thus, the first layer 26 separates the second layer 28 from the first glass pane 16. When the second layer 28 is deposited directly on the first layer 26, there are no intervening layers between the first layer 26 and the second layer 28. In certain embodiments, the second layer 28 is pyrolytic.

Preferably, the second layer 28 has a thickness of 50 nm or less. Preferably, the thickness of the second layer 28 is 35 nm or less. In some embodiments, the second layer 28 has a thickness that is greater than the thickness of the first layer 26. In other preferred embodiments, the second layer 28 has a thickness that is less than the thickness of the first layer 26. In an embodiment, the thickness of the second layer 28 is preferably 10-35 nm, more preferably 15-30 nm, even more preferably 15-25 nm. These preferred thicknesses assist in controlling the color of the laminated window assembly to an aesthetically acceptable degree.

In an embodiment, the refractive index of the second layer 28 is at least 1.4 but less than 1.6. Preferably, the refractive index of the second layer 28 may be between 1.4 and 1.5.

In these embodiments it may be preferred that the second layer 28 comprises an oxide of silicon. In one such embodiment, the second layer 28 comprises silicon dioxide ($SiO_2$). In these embodiments, the second layer 28 comprises silicon and oxygen. The second layer 28 may also include a trace amount of one or more additional constituents such as, for example, carbon. Thus, in certain embodiments, the second layer 28 may consist essentially of, preferably consist of, silicon dioxide. However, other materials that exhibit a desirable refractive index may be suitable for use in the second layer 28.

In certain embodiments, the first layer 26 and the second layer 28 form an iridescence-suppressing interlayer. In another embodiment (not depicted), the iridescence-suppressing interlayer may be formed from a single layer. In these embodiments, it may be preferred that the iridescence-suppressing interlayer has a thickness of about $1/6^{th}$ to about $1/12^{th}$ of a 500 nm design wavelength.

The third layer 30 is deposited over, and preferably, directly on, the second layer 28. Thus, the second layer 28 separates the third layer 30 from the first layer 26. When the third layer 30 is deposited directly on the second layer 28, there are no intervening layers between the third layer 30 and the second layer 28. It is preferred that the third layer 30 is pyrolytic.

The third layer 30 has a refractive index that is greater than the refractive index of the second layer 28. Also, in some embodiments, the third layer 30 has a refractive index that is greater than the refractive index of the fourth layer 32. Preferably, the third layer 30 has a refractive index of 1.6 or more. In certain embodiments, the refractive index of the third layer 30 is 1.8 or more. In an embodiment, the refractive index of the third layer 30 is between 1.8 and 2.0.

It is preferred that, the third layer 30 comprises a transparent conductive metal oxide. In some embodiments, the third layer 24 comprises fluorine doped tin oxide ($SnO_2$:F). In other embodiments, the third layer 24 may consist essentially of, preferably consist of, fluorine doped tin oxide. However, other transparent conductive metal oxide materials may be suitable for use in the third layer 30. For example, in some embodiments, the third layer 30 may comprise antimony doped tin oxide ($SnO_2$:Sb) or another doped tin oxide. In these embodiments, the third layer 30 may consist essentially of antimony doped tin oxide or another doped tin oxide.

In an embodiment, the third layer 30 has a thickness of 200-450 nm. Preferably the third layer 30 has a thickness of at least 250 nm, more preferably at least 290 nm, even more preferably at least 300 nm, but preferably at most 380 nm, more preferably at most 340 nm, even more preferably at most 330 nm. These preferred thicknesses help avoid the formation in the coating of aesthetically undesirable laminar flow stripes.

Due primarily to the composition of the first glass pane 16 and third layer 30, the coated glass article 38 may exhibit an improved solar energy transmittance. Further, because of the composition and thickness of the third layer 30, the coated glass article 38 may also exhibit a low emissivity. Thus, the third layer may also be referred to herein as a low emissivity layer.

The fourth layer 32 is deposited over, and preferably, directly on, the third layer 30. When the fourth layer 32 is deposited directly on the third layer 30, there are no intervening layers between the third layer 30 and the fourth layer 32. In some embodiments, the fourth layer 32 may be the outermost layer of the coating 20. When the fourth layer 32 is the outermost layer of the coating 20, the fourth layer 32 may form an outer surface 34 of the coated glass article 38. When the coated glass article 38 is included in a laminated window assembly 10 and the laminated window assembly 10 is utilized as a vehicle window, it is preferred that the outer surface 34 defined by the coating 20 faces into the passenger cabin of the vehicle.

In certain embodiments, the fourth layer 32 has a refractive index that is 1.7 or less. Preferably, the refractive index of the fourth layer 32 is 1.4-1.7. In an embodiment, the refractive index of the fourth layer 32 may be between 1.5 and 1.7. In another embodiment, the refractive index of the fourth layer 32 may be between 1.4 and 1.5.

Preferably, the fourth layer 32 comprises a dielectric material. Preferred dielectric materials include oxides of silicon. In an embodiment, the fourth layer 32 comprises silicon dioxide ($SiO_2$) or another suitable oxide of silicon. The fourth layer 32 may also include a trace amount of one or more additional constituents such as, for example, carbon. Thus, in certain embodiments, the fourth layer 32 may consist essentially of, preferably consist of, silicon dioxide. However, in other embodiments, the fourth layer 32 may comprise an oxide of silicon and one or more additional materials, which are provided to increase the refractive index of the fourth layer 32 above 1.5. In one such embodiment, the fourth layer 32 may also comprise aluminum oxide ($Al_2O_3$), titanium dioxide ($TiO_2$), zirconium oxide ($ZrO_2$), boron oxide ($B_2O_3$), phosphorus oxide ($P_2O_5$), or tin oxide. Additionally, other materials that are dielectric may be suitable for use in the fourth layer 32. For example, in some embodiments, the oxide of silicon may be replaced with a metal oxide. Suitable metal oxides include aluminum oxide ($Al_2O_3$), titanium dioxide ($TiO_2$), zirconium oxide ($ZrO_2$), undoped tin oxide ($SnO_2$), and mixtures thereof.

In certain embodiments, the fourth layer 32 is deposited on the third layer 30 at a thickness of 100 nm or less. Preferably, the fourth layer 32 is deposited at a thickness of 40-100 nm. In some embodiments, it may be preferred that the thickness of the fourth layer 32 is 70-100 nm. In other embodiments, it may be preferred that the thickness of the fourth layer 32 is 40-70 nm, e.g. the thickness of the fourth layer 32 is preferably at least 45 nm, more preferably at least 50 nm, but preferably at most 65 nm, more preferably at most 60 nm. These preferred thicknesses assist in ensuring that the laminated window assembly of the present invention exhibits very low total visible light reflectance e.g. less than 4.0% (Illuminant A, 2 degree observer).

In certain embodiments, the fourth layer 32 is pyrolytic. When the fourth layer 32 is pyrolytic, the fourth layer 32 may be deposited by an APCVD process. In other embodiments, the fourth layer 32 may not be pyrolytic. In these embodiments, the fourth layer 32 may be deposited utilizing a liquid which provides a layer of the sol-gel variety. Conventional liquids for forming a sol-gel layer comprising silicon dioxide may be utilized to deposit the fourth layer 32. Preferably, in these embodiments, the liquid may comprise a hydrolysable silicon compound that undergoes hydrolysis and condensation. Preferred silicon compounds are silicon alkoxides such as, for example, tetraethoxysilane (TEOS). In certain embodiments, the liquid may also comprise silica particles. In embodiments where the liquid includes a metal oxide additive, the liquid may include halides, alkoxides, nitrates, or acetylacetonate compounds of aluminum, titanium, zirconium, or tin.

When the fourth layer 32 is deposited utilizing a liquid, the liquid is dried. Drying may be performed by heating the coated glass article 38 after the liquid has been applied over the third layer 30. Heating may be to a temperature of 250° C. or less. Preferably, drying occurs at a temperature of 200° C. or less. After drying, the fourth layer may be cured. Curing may be performed by irradiation with ultraviolet radiation, heating, or by another method. When the curing step comprises heating, the fourth layer 32 may be heated to a temperature of 90-720° C. After curing, the coated glass article 38 is cooled over a predetermined period of time.

Figure 5:
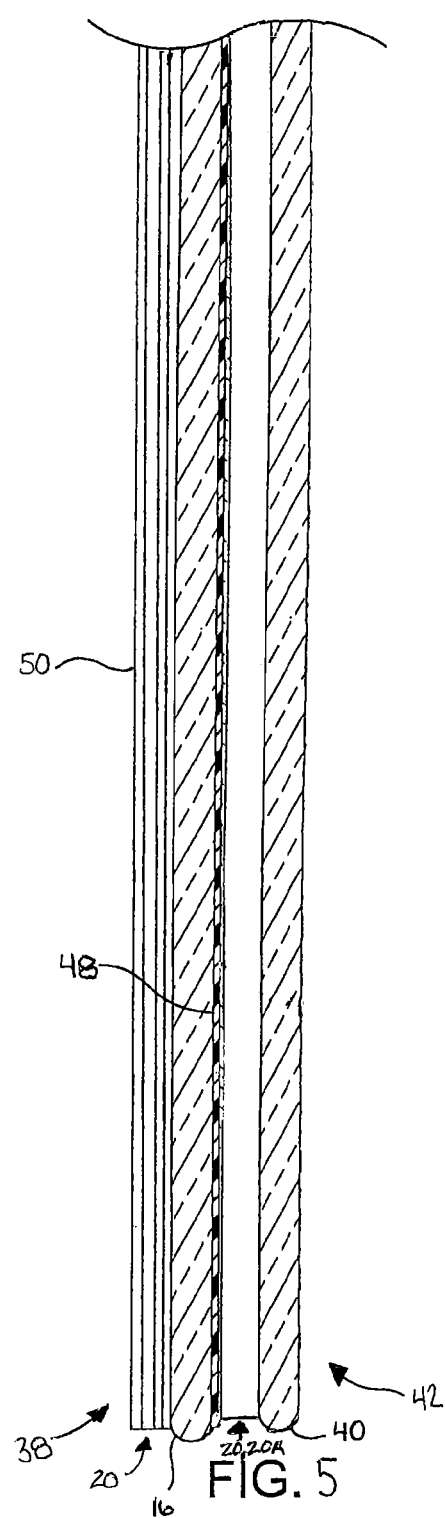
FIG. 5 is a cross-sectional view of another embodiment of a portion of the laminated window assembly of FIG. 2 along line 5-5.

Referring now to FIGS. 3 and 5, the laminated window assembly 10 comprises two glass panes 16, 40. In the embodiment illustrated in FIG. 3, the laminated window assembly 10 is formed by laminating the first glass pane 16 to a second glass pane 40. In other embodiments, like the one illustrated in FIG. 5, the laminated window assembly 10 is formed by laminating the coated glass article 38 to another coated glass article 42. In this embodiment, the coated glass article 42 may comprise the second pane of glass 40 and the coating 20 described above. In other embodiments, the coated glass article 42 may comprise the second pane of glass 40 and another coating 20A.

In a preferred embodiment, the coated glass article 42 may be of a glass/SnO$_2$/SiO$_2$/SnO$_2$:F arrangement. In this embodiment, the coating 20A comprises a first layer including tin oxide. The first layer may be configured in a manner similar to the first layer 26 described above. Also, in this embodiment, the coating 20A comprises a second layer including silicon dioxide. The second layer may be configured in a manner similar to the second layer 28 described above. The third layer includes fluorine doped tin oxide and may be configured in a manner similar to the third layer 30 described above In some embodiments, the first glass pane 16 and the second glass pane 40 are substantially the same. Referring back to FIG. 3, the second glass pane 40 has a first major surface 44 and a second major surface 46. The first major surface 44 and the second major surface 46 are provided in a parallel relationship with each other. The first major surface 44 of the second glass pane 40 and the second major surface 24 of the first glass pane 16 face each other and, in certain embodiments, may be in a parallel relationship with each other.

When the embodiments of the laminated window assembly 10 illustrated in FIGS. 3 and 5 are utilized in a vehicle application, it is preferred that the second glass pane 40 is the outer pane of the assembly 10. In these embodiments, the second major surface 46 of the second glass pane defines a first surface of the laminated window assembly 10 and the first major surface 44 of the second glass pane 40 defines a second surface of the laminated window assembly 10. Also, the second major surface 24 of the first glass pane 16 defines a third surface of the laminated window assembly 10 and the first major surface 22 of the first glass pane 16 defines a fourth surface of the laminated window assembly 10. As illustrated in FIG. 5, it is preferred that a coating 20, 20A is provided on the second surface of the laminated window assembly 10 and the fourth surface of the laminated window assembly 10 or the coating 20 is provided only on the fourth surface of the laminated window assembly 10, which is illustrated in FIG. 3.

The composition and thickness of the second glass pane 40 may be selected to allow the laminated window assembly 10 to exhibit certain solar, visible light transmittance, visible light reflectance, and color properties. In some embodiments, the second glass pane 40 has a thickness of 20 mm or less. Preferably, the second glass pane 40 has a thickness of 0.5-20.0 mm. In some embodiments, the second glass pane 40 may have a thickness of 0.5-10.0 mm. More preferably, the second glass pane 40 has a thickness of 0.5-5.0 mm.

The second glass pane 40 may be formed using a float glass manufacturing process and provided as a sheet of float glass. When the second glass pane 40 is formed using a float glass manufacturing process, it is preferred that the second glass pane 40 is a soda-lime-silica glass. Soda-lime-silica glass compositions like the ones described above for the first glass pane 16 are suitable for the second glass pane 40. Additionally, the colors described above for the first glass pane 16 are suitable for the second glass pane 40.

In some embodiments, the glass panes 16, 40 utilized in the laminated window assembly 10 may be flat. In other embodiments, the glass panes 16, 40 utilized in the laminated window assembly 10 may be curved by way of a shaping process. Additionally, the glass panes 16, 40 may be heat strengthened, thermally toughened, or chemically strengthened, which may occur before or after deposition of a coating 20, 20A.

The laminated window assembly 10 also comprises a polymeric interlayer 48 provided between the first glass pane 16 and the second glass pane 40. The polymeric interlayer 48 is not limited to a particular thickness. However, in certain embodiments, the polymeric interlayer 48 has a thickness of between 0.3 and 1.8 mm, preferably, between 0.5 and 1.6 mm. More preferably, the polymeric interlayer 48 has a thickness of between 0.6 and 0.9 mm. In one such embodiment, the thickness of the polymeric interlayer 48 is 0.76 mm.

The polymeric interlayer 48 may comprise a first major surface and a second major surface. In certain embodiments, the polymeric interlayer 48 is provided as a polymer sheet in a shape substantially matched to that of the glass panes 16, 40. As illustrated, the first major surface and the second major surface of the polymeric interlayer 48 may be provided in a parallel relationship with each other.

In some embodiments, the polymeric interlayer 48 is clear and substantially transparent to visible light. In embodiments where the polymeric interlayer 48 is clear, it may be preferred that the first glass pane 16 is a grey glass and the second glass pane 40 is a grey glass. In other embodiments, the polymeric interlayer 48 can be tinted and/or comprise an infrared (IR) reflective film to provide additional solar control features. When the polymeric interlayer 48 comprises an IR reflective film, the film may include one or more layers and at least one layer may comprise silver or another material with similar infrared radiation reflectance properties. In an embodiment, the polymeric interlayer 48 may be sold under the trademark XIR and manufactured by the Eastman Chemical Company.

In embodiments where the polymeric interlayer 48 is tinted, the first glass pane 16 and the second glass pane 40 may each be a clear glass. When the polymeric interlayer 48 is tinted, it is preferred that the polymeric interlayer 48 exhibits a total visible light transmittance (Illuminant D65, 10 degree observer) of 35.0% or less. In some embodiments, the polymeric interlayer 48 exhibits a total visible light transmittance (Illuminant D65, 10 degree observer) of less than 10.0%. In other embodiments, the polymeric interlayer 48 exhibits a total visible light transmittance (Illuminant D65, 10 degree observer) of less than 5.0%. In these embodiments, the polymeric interlayer 48 may exhibit a total visible light transmittance (Illuminant D65, 10 degree observer) of 0.5-4.5%.

The polymeric interlayer 48 may also exhibit other advantageous properties when it is tinted. For example, the polymeric interlayer 48 may exhibit a neutral color for the visible light reflected from or transmitted through the interlayer 48. In one such embodiment, the polymeric interlayer 48 exhibits an a* value (Illuminant D65, 10 degree observer) in a range from about −6 to 6 and a b* value (Illuminant D65, 10 degree observer) in the range from about −6 to 6.

Additionally, the polymeric interlayer 48 may exhibit a low total solar energy transmittance when it is tinted. As used in this paragraph, the total solar energy transmittance (TTS) may refer to the solar energy transmitted directly through the polymeric interlayer and the solar energy absorbed by the polymeric interlayer, and subsequently convected and thermally radiated inwardly integrated over the wavelength range 300 to 2500 nm according to the relative solar spectral distribution for air mass 1.5. The total solar transmittance may be determined according to a recognized standard such as ISO 13837:2008 convention A and at a wind speed of 14 kilometers per hour. In an embodiment, the polymeric interlayer 48 exhibits a total solar energy transmittance of 35.0 or less. Preferably, the total solar energy transmittance exhibited by the polymeric interlayer 48 is 30.0 or less.

In some embodiments, the polymeric interlayer 48 may exhibit a low transmitted energy (TE), which reduces the amount of heat transmitted through the assembly 10. As used herein, transmitted energy or direct solar heat transmission (DSHT) is measured at Air Mass 2 (simulated rays from the sun incident at an angle of 30° to the horizontal) over the wavelength range 350 to 2100 nm at 50 nm intervals. In an embodiment, the polymeric interlayer 48 may exhibit a transmitted energy of 40% or less, when measured at Air Mass 2, ISO 9050.

The polymeric interlayer 48 is of or includes a suitable polymer such as, for example, polyvinyl butyral (PVB) or another suitable material like PVC, EVA, EMA, and polyurethane. In an embodiment, the polymeric interlayer 48 is a sheet of Saflex® PVB which is manufactured and sold by the Eastman Chemical Company.

To form the laminated window assembly 10, the first glass pane 16 and the second glass pane 40 are laminated to each other or are otherwise adhered together via the polymeric interlayer 48. Lamination processes known in the art are suitable for forming the laminated window assembly 10. Generally, such lamination processes will include inserting the polymeric interlayer 48 between the first glass pane 16 and the second glass pane 40 and subjecting the interlayer 48 and panes 16, 40 to a predetermined temperature and pressure to create the laminated window assembly 40.

It is preferred that after lamination the laminated window assembly 10 has a thickness of 10 mm or less. In an embodiment, the laminated window assembly 10 has a thickness of 3-10 mm. More preferably, the thickness of the laminated window assembly 10 is 6 mm or less. Even more preferably, the thickness of the laminated window assembly 10 is 5 mm or less. In an embodiment, the laminated window assembly 10 has a thickness of 3-5 mm. However, the laminated window assembly 10 may be of other thicknesses.

Once formed, the laminated window assembly 10 exhibits a desirable total visible light transmittance and total visible light reflectance. For describing the laminated window assembly 10, total visible light transmittance will refer to the percentage of visible light passing through the laminated window assembly 10 as measured from a first side 50 of the assembly 10 at a 90 degree angle incident to the laminated window assembly 10. Also, for describing the laminated window assembly 10, total visible light reflectance will refer to the percentage of visible light reflected from the laminated window assembly 10 as measured from the first side 50 of the assembly 10 at a 90 degree angle incident to the laminated window assembly 10. Further, the total visible light transmittance and total visible light reflectance will be described herein according to the CIELAB color scale system using Illuminant A, 2 degree observer and can be measured using a commercially available spectrophotometer such as the Perkin Elmer Lambda 950.

In some embodiments, the laminated window assembly 10 exhibits a total visible light transmittance (Illuminant A, 2 degree observer) of more than 70.0%. In these embodiments, the laminated window assembly 10 may be a windshield, side window, or rear window of the vehicle. In other embodiments, the laminated window assembly 10 exhibits a total visible light transmittance (Illuminant A, 2 degree observer) of less than 70.0%. In certain embodiments, the laminated window assembly 10 exhibits a total visible light transmittance (Illuminant A, 2 degree observer) of less than 20.0%. In these embodiments, the laminated window assembly 10 may be a roof glazing, side window, or rear window of the vehicle. Preferably, in these embodiments, the total visible light transmittance (Illuminant A, 2 degree observer) is 10.0% or less. More preferably, the total visible light transmittance (Illuminant A, 2 degree observer) is 5.0% or less. In this embodiment, the total visible light transmittance (Illuminant A, 2 degree observer) may be 2.0-5.0%. Additionally, it is preferred that, in the embodiments described above, the laminated window assembly 10 exhibits a total visible light reflectance (Illuminant A, 2 degree observer) of 5.0% or less. In an embodiment, the total visible light reflectance (Illuminant A, 2 degree observer) is 1.0-5.0%. More preferably, the total visible light reflectance (Illuminant A, 2 degree observer) is 4.0% or less. In one such embodiment, the total visible light reflectance (Illuminant A, 2 degree observer) is 1.0-4.0%. Even more preferably, the total visible light reflectance (Illuminant A, 2 degree observer) is 3.0% or less. In one such embodiment, the total visible light reflectance (Illuminant A, 2 degree observer) is 1.0-3.0%.

The laminated window assembly 10 may also exhibit other properties that are advantageous. For example, the laminated window assembly 10 may exhibit a neutral color for the visible light reflected from the first side 50 of the assembly 10 when viewed at a 90 degree angle incident (normal incidence) to the laminated window assembly 10. The color of the visible light reflected from the first side 50 of the laminated window assembly 10 may be referred to herein as "reflected color." The reflected color will be described herein according to the CIELAB color scale system using Illuminant A, 2 degree observer. Reflected color can be measured using a commercially available spectrophotometer such as the Perkin Elmer Lambda 950. Also, for the purpose of describing the embodiments of the laminated window assembly 10 disclosed herein, a neutral color for the visible light reflected from the first side 50 of the laminated window assembly 10 has an a* value (Illuminant A, 2 degree observer) in the range of −6 to 6 and a b* value (Illuminant A, 2 degree observer) in the range of −6 to 6. In some embodiments, the laminated window assembly 10 exhibits a reflected color in a range from about −6 to 0 for the a* value (Illuminant A, 2 degree observer) and a range from about 0 to 6 for the b* value (Illuminant A, 2 degree observer). It should be appreciated that a negative a* value indicates a green color hue and a negative b* value indicates a blue color hue. Whereas, a positive a* value indicates a red color hue and a positive b* value indicates a yellow color hue. In these embodiments, the laminated window assembly 10 may exhibit a reflected color that is negative for the a* value (Illuminant A, 2 degree observer) and is positive for the b* value (Illuminant A, 2 degree observer).

The laminated window assembly 10 may also exhibit a reflected color at an oblique angle of incidence that is neutral. In fact, in some embodiments, the reflected color exhibited by the laminated window assembly 10 becomes more neutral as the angle of incidence changes from a normal angle to an oblique angle of incidence. In some embodiments, at an angle of incidence of 30 degrees, the laminated window assembly 10 may exhibit a reflected color in a range from about −6 to 6 for the a* value (Illuminant A, 2 degree observer) and a range from about −6 to 6 for the b* value (Illuminant A, 2 degree observer). In other embodiments, at an angle of incidence of 45 degrees, the laminated window assembly 10 may exhibit a reflected color in a range from about −6 to 3 for the a* value (Illuminant A, 2 degree observer) and a range from about −3 to 6 for the b* value (Illuminant A, 2 degree observer). In other embodiments, at an angle of incidence of 60 degrees, the laminated window assembly 10 may exhibit a reflected color in a range from about −3 to 3 for the a* value (Illuminant A, 2 degree observer) and a range from about −3 to 3 for the b* value (Illuminant A, 2 degree observer).

The laminated window assembly 10 may exhibit a low total solar energy transmittance. As used herein, total solar energy transmittance (TTS) may refer to the solar energy transmitted directly through the laminated window assembly and the solar energy absorbed by the laminated window assembly, and subsequently convected and thermally radiated inwardly integrated over the wavelength range 300 to 2500 nm according to the relative solar spectral distribution for air mass 1.5. The total solar transmittance may be determined according to a recognized standard such as ISO 13837:2008 convention A and at a wind speed of 14 kilometers per hour.

In an embodiment, the laminated window assembly 10 exhibits a total solar energy transmittance of 35.0% or less. Preferably, the total solar energy transmittance exhibited by the laminated window assembly 10 is 30.0% or less. More preferably, the total solar energy transmittance exhibited by the laminated window assembly 10 is 25.0% or less. In some embodiments, the total solar energy transmittance exhibited by the laminated window assembly 10 is 20.0-25.0%. Even more preferably, the total solar energy transmittance exhibited by the laminated window assembly 10 is 20.0% or less. In one such embodiment, the total solar energy transmittance exhibited by the laminated window assembly 10 is 15.0-20.0%. Thus, in the summer, if the laminated window assembly 10 is utilized as a window for a vehicle, the laminated window assembly 10 will help to prevent the passenger cabin from overheating.

Preferably, the laminated window assembly 10 exhibits a low transmitted energy. In an embodiment, the laminated window assembly 10 exhibits a transmitted energy of 30% or less, when measured at Air Mass 2, ISO 9050. Preferably, the laminated window assembly 10 exhibit a transmitted energy of less than 20% and more preferably less than 10%. Even more preferably, the laminated window assembly 10 exhibits a transmitted energy of less than 5%.

Preferably, the laminated window assembly 10 exhibits a low emissivity. The emissivity of the laminated window assembly 10 can be measured using a commercially available spectrometer such as the Perkin Elmer FTIR. In some embodiments, the laminated window assembly 10 may exhibit an emissivity of less than 0.4. In an embodiment, the laminated window assembly 10 exhibits an emissivity of 0.05-0.4. Preferably, the laminated window assembly 10 exhibits an emissivity of less than 0.3. In an embodiment, the laminated window assembly 10 exhibits an emissivity of 0.05-0.3. More preferably, the laminated window assembly 10 exhibits an emissivity of less than 0.2. In an embodiment, the laminated window assembly 10 exhibits an emissivity of 0.05-0.2. When the laminated window assembly 10 exhibits an emissivity like those described above and is utilized as a window for a vehicle, the laminated window assembly 10 will provide a good insulating effect for the passenger cabin of the vehicle.

EXAMPLES

The following examples are presented solely for the purpose of further illustrating and disclosing the embodiments of the coated glass article. Examples of laminated window assemblies within the scope of the invention are described below and illustrated in TABLEs 1 and 2.

In TABLE 1, the laminated window assemblies within the scope of the invention are Ex 1-Ex 6. Ex 1-Ex 6 are predictive. Each of the laminated window assemblies of Ex 1-Ex 6 comprised a first glass pane that was clear and of a soda-lime-silica composition. Each of the laminated window assemblies of Ex 1-Ex 6 also comprised a coating formed on a major surface of the first glass pane. Each coating comprised a first layer, second layer, third layer, and fourth layer. The first layer was on the glass pane and comprised tin oxide. The thickness of the first layer was 20 nm. The second layer was on the first layer and comprised silicon dioxide. The thickness of the second layer was 30 nm. The third layer was on the second layer and comprised fluorine doped tin oxide. The thickness of the third layer was 300 nm. The fourth layer was on the third layer and comprised silicon dioxide. The thickness of the fourth layer was 55 nm. Thus, the coated glass articles of Ex 1-Ex 6 were each of a glass/$SnO_2$/$SiO_2$/$SnO_2$:F/$SiO_2$ arrangement.

The first glass pane was laminated to a second glass pane. For Ex 1-Ex 6, the second glass pane was clear and of a soda-lime-silica composition. For Ex 1-Ex 3, a coating was formed on a major surface of the second glass pane. Each coating comprised a first layer, second layer, and third layer. The first layer was on the glass pane and comprised tin oxide. The thickness of the first layer was 25 nm. The second layer was on the first layer and comprised silicon dioxide. The thickness of the second layer was 25 nm. The third layer was on the second layer and comprised fluorine doped tin oxide. The thickness of the third layer was 330 nm. Thus, for Ex 1-Ex 3, the laminated window assembly included a second coated glass article and each was of a glass/$SnO_2$/$SiO_2$/$SnO_2$:F arrangement.

A polymeric interlayer was provided between the first glass pane and the second glass pane. The thickness of the polymeric interlayer was 0.76 mm. The polymeric interlayer comprised PVB and was tinted. For Ex 1 and Ex 4, the polymeric interlayer exhibited a total visible light transmittance (Illuminant D65, 10 degree observer) of 1.5%. For Ex 2 and Ex 5, the polymeric interlayer exhibited a total visible light transmittance (Illuminant D65, 10 degree observer) of 4.4%. For Ex 3 and Ex 6, the polymeric interlayer exhibited a total visible light transmittance (Illuminant D65, 10 degree observer) of 7.7%.

After lamination, the laminated window assemblies of Ex 1-Ex 3 were of the following arrangement: $SiO_2$/$SnO_2$:F/$SiO_2$/$SnO_2$/first glass pane/polymeric interlayer/$SnO_2$:F/$SiO_2$/$SnO_2$/second glass pane. Also, after lamination, the laminated window assemblies of Ex 4-Ex 6 were of the following arrangement: $SiO_2$/$SnO_2$:F/$SiO_2$/$SnO_2$/first glass pane/polymeric interlayer/second glass pane.

The total visible light transmittance (Tvis), total visible light reflectance (Rf), reflected color (Rfa*, Rfb*, Rfa*(30°), Rfb*(30°), Rfa*(45°), Rfb*(45°), Rfa*(60°), Rfb*(60°), and total solar energy transmittance (TTS) of the laminated window assemblies of Ex 1-Ex 6 are reported in TABLE 1. For the laminated window assemblies of Ex 1-Ex 6, the total visible light transmittance, total visible light reflectance, reflected color, and total solar energy transmittance were calculated by modeling and according to the CIELAB color scale system using illuminant A, 2 degree observer. For the laminated window assemblies of Ex 1-Ex 6, the total visible light transmittance refers to the percentage of visible light passing through the laminated window assembly that would be measured from the side having the four layer coating or facing the fourth surface of the laminated window assembly. The total visible light reflectance refers to the percentage of visible light reflected from the laminated window assembly that would be measured from the side having the four layer coating. The total visible light reflectance and the total visible light transmittance are expressed as percentages. The reflected color is reported below at normal incidence (Rfa*, Rfb*), an angle of incidence of 30 degrees (Rfa*(30°), Rfb*(30°)), an angle of incidence of 45 degrees)(Rfa*(45°), Rfb*(45°), and an angle of incidence of 60 degrees (Rfa*(60°), Rfb*(60°)). Also, the reflected color is reported for the side of each laminated window assembly having the four layer coating. Also, the total solar energy transmittance reported below is expressed as a percentage.

TABLE 1

| Examples | Tvis | Rf | Rfa* | Rfb* | Rfa* (30°) | Rfb* (30°) | Rfa* (45°) | Rfb* (45°) | Rfa* (60°) | Rfb* (60°) | TTS |
|---|---|---|---|---|---|---|---|---|---|---|---|
| Ex 1 | 1.5 | 3.8 | −2.3 | 4.4 | −1.9 | 1.5 | −1.5 | −0.1 | 0.7 | −1.1 | 18.3 |
| Ex 2 | 3.5 | 3.9 | −2.3 | 4.3 | −1.8 | 1.5 | −1.5 | −0.1 | 0.7 | 1.2 | 19.3 |
| Ex 3 | 6.7 | 3.9 | −2.3 | 4.2 | −1.8 | 1.5 | −1.5 | 0.1 | 0.7 | −1.2 | 20.9 |
| Ex 4 | 1.6 | 3.8 | −2.6 | 5.1 | −2.0 | 1.8 | −1.6 | 0.1 | 0.5 | −1.0 | 19.2 |
| Ex 5 | 3.7 | 3.9 | −2.6 | 5.0 | −1.9 | 1.8 | −1.6 | 0.1 | 0.6 | −1.0 | 20.3 |
| Ex 6 | 7.1 | 3.8 | −2.6 | 5.1 | −1.9 | 1.8 | −1.6 | 0.1 | 0.6 | −1.0 | 21.8 |

As shown in TABLE 1, the laminated window assemblies of Ex 1-Ex 6 each exhibit a total visible light transmittance (Illuminant A, 2 degree observer) of less than 10.0% and total visible light reflectance (Illuminant A, 2 degree observer) of less than 4.0%. Further, the laminated window assemblies of Ex 1-Ex 6 each exhibit a total solar energy transmittance of 15.0-25.0%. Also, the laminated window assemblies of Ex 1-Ex 6 each exhibit a neutral reflected color at a normal angle of incidence and at oblique angles of incidence.

In TABLE 2, the laminated window assemblies within the scope of the invention are Ex 7-Ex 10. Comparative examples, not considered to be a part of the invention, is also described below and illustrated in TABLE 2. In TABLE 2, the comparative examples are designated as C1 and C2, respectively.

Each of the laminated window assemblies of C1 and C2 comprised a first glass pane that was clear float glass of a soda-lime-silica composition. Each of the laminated window assemblies of C1 and C2 also comprised a coating formed on a major surface of the first glass pane. Each coating comprised a first layer, second layer, and third layer. The first layer was on the glass pane and comprised tin oxide. The second layer was on the first layer and comprised silicon dioxide. The third layer was on the second layer and comprised fluorine doped tin oxide. Thus, for C1 and C2, the laminated window assemblies included a first coated glass article that was of a glass/$SnO_2$/$SiO_2$/$SnO_2$:F arrangement. The thicknesses of the first layer, second layer, and third layer were similar to the thicknesses reported for the coatings formed on the second glass panes of Ex 1-Ex 3.

The first glass pane was laminated to a second glass pane. For C1 and C2, the second glass pane was float glass of a soda-lime-silica composition. A coating was formed on a major surface of each second glass pane. Each coating was similar to the coating formed on the first glass pane of C1 and C2. Thus, for C1 and C2, the laminated window assembly included a second coated glass article that was of a glass/$SnO_2$/$SiO_2$/$SnO_2$:F arrangement.

A polymeric interlayer was provided between the first glass pane and the second glass pane. The thickness of the polymeric interlayer was 0.76 mm. The polymeric interlayer comprised PVB. For C1, the polymeric interlayer exhibited a total visible light transmittance (Illuminant D65, 10 degree observer) of 8%. For C2, the polymeric interlayer exhibited a total visible light transmittance (Illuminant D65, 10 degree observer) of 2%.

After lamination, the laminated window assemblies of C1 and C2 were of the following arrangement: $SnO_2$:F/$SiO_2$/$SnO_2$/first glass pane/polymeric interlayer/$SnO_2$:F/$SiO_2$/$SnO_2$/second glass pane.

Each of the laminated window assemblies of Ex 7-Ex 10 comprised a first glass pane that was clear float glass of a soda-lime-silica composition. Each of the laminated window assemblies of Ex 7-Ex 10 also comprised a coating formed on a major surface of the first glass pane. Each coating comprised a first layer, second layer, third layer, and fourth layer. The first layer was on the glass pane and comprised tin oxide. The thickness of the first layer was 20 nm for Ex 7-9 and 26.4 nm for Ex 10. The second layer was on the first layer and comprised silicon dioxide. The thickness of the second layer was 30 nm for Ex 7-9 and 17.4 nm for Ex 10. The third layer was on the second layer and comprised fluorine doped tin oxide. The thickness of the third layer was 307 nm for Ex 7-9 and 303 nm for Ex 10. The fourth layer was on the third layer and comprised silicon dioxide. The thickness of the fourth layer was 55 nm for all of Ex 7-10.

Thus, the first coated glass articles of Ex 7-Ex 10 were each of a glass/$SnO_2$/$SiO_2$/$SnO_2$:F/$SiO_2$ arrangement.

The first glass pane was laminated to a second glass pane. For Ex 7-Ex 10, the second glass pane was float glass of a soda-lime-silica composition. For Ex 7, the second glass pane was uncoated. For Ex 8-10, a coating was formed on a major surface of the second glass pane.

For Ex 8 and 10, the coating comprised a first layer, second layer, and third layer. The first layer was on the glass pane and comprised tin oxide. The second layer was on the first layer and comprised silicon dioxide. The third layer was on the second layer and comprised fluorine doped tin oxide. Thus, for Ex 8 and 10, the laminated window assembly included a second coated glass article that was of a glass/$SnO_2$/$SiO_2$/$SnO_2$:F arrangement. The thicknesses of the first layer, second layer, and third layer were similar to (for Ex 8) and the same as (for Ex 10) the thicknesses reported for the coatings formed on the second glass panes of Ex 1-Ex 3.

For Ex 9, the coating formed on the second pane of glass was similar in layer arrangement, thickness, and composition to the coating formed on the first glass pane. Thus, for Ex 9, the laminated window assembly included a second coated glass article of a glass/$SnO_2$/$SiO_2$/$SnO_2$:F/$SiO_2$ arrangement.

A polymeric interlayer was provided between the first glass pane and the second glass pane. The thickness of the polymeric interlayer was 0.76 mm. The polymeric interlayer comprised PVB. For Ex 7 and Ex 10, the polymeric interlayer exhibited a total visible light transmittance (Illuminant D65, 10 degree observer) of 4.4%. For Ex 8 and Ex 9, the polymeric interlayer exhibited a total visible light transmittance (Illuminant D65, 10 degree observer) of 8%.

After lamination, the laminated window assembly of Ex 7 was of the following arrangement: $SiO_2$/$SnO_2$:F/$SiO_2$/$SnO_2$/first glass pane/polymeric interlayer/second glass pane. After lamination, the laminated window assemblies of Ex 8 and Ex 10 were both of the following arrangement: $SiO_2$/$SnO_2$:F/$SiO_2$/$SnO_2$/first glass pane/polymeric interlayer/$SnO_2$:F/$SiO_2$/$SnO_2$/second glass pane. After lamination, the laminated window assembly of Ex 9 was of the following arrangement: $SiO_2$/$SnO_2$:F/$SiO_2$/$SnO_2$/first glass pane/polymeric interlayer/$SiO_2$/$SnO_2$:F/$SiO_2$/$SnO_2$/second glass pane.

The total visible light transmittance (Tvis), total visible light reflectance (Rf), emissivity ($\varepsilon$), reflected color (Rfa*, Rfb*, Rfa*(30°), Rfb*(30°), Rfa*(45°), Rfb*(45°), Rfa*(60°), Rfb*(60°), and total solar energy transmittance (TTS) of the laminated window assemblies of Ex 7-Ex 10 and C1-C2 are reported in TABLE 1. For the laminated window assemblies of Ex 7-Ex 10 and C1-C2, the total visible light transmittance, total visible light reflectance, reflected color, and total solar energy transmittance were calculated by modeling and according to the CIELAB color scale system using illuminant A, 2 degree observer. For the laminated window assemblies of Ex 7-Ex 10 and C1-C2, the total visible light transmittance refers to the percentage of visible light passing through the laminated window assembly that would be measured from the side facing the fourth surface of the laminated window assembly. The total visible light reflectance refers to the percentage of visible light reflected from the laminated window assembly that would be measured from the side facing the fourth surface of the laminated window assembly. The total visible light reflectance and the total visible light transmittance are expressed as percentages. The emissivity was measured using a commercially available spectrometer such as the Perkin Elmer FTIR. The reflected color is reported below at normal incidence (Rfa*, Rfb*), an angle of incidence of 30 degrees)(Rfa*(30°), Rfb*(30°)), an angle of incidence of 45 degrees (Rfa*(45°), Rfb*(45°), and an angle of incidence of 60 degrees (Rfa*(60°), Rfb*(60°)). Also, the reflected color is reported for the side of each laminated window assembly having the four layer coating. Also, the total solar energy transmittance reported below is expressed as a percentage.

TABLE 2

| Examples | Tvis | Rf | ε | Rfa* | Rfb* | Rfa*(30°) | Rfb*(30°) | Rfa*(45°) | Rfb*(45°) | Rfa*(60°) | Rfb*(60°) | TTS |
| --- | --- | --- | --- | --- | --- | --- | --- | --- | --- | --- | --- | --- |
| C1 | 8.0 | 10.3 | 0.16 | −0.2 | −2.3 | −1.6 | −2.8 | −4.4 | −2.7 | −5.9 | −2.0 | 21.4 |
| C2 | 2.1 | 10.1 | 0.16 | −0.2 | −2.3 | −1.6 | −2.8 | −3.7 | −2.4 | −5.9 | −2.0 | 18.1 |
| Ex 7 | 4.0 | 3.0 | 0.20 | −2.3 | 8.9 | −2.5 | 7.5 | −2.0 | 4.0 | −1.0 | 1.8 | 20.7 |
| Ex 8 | 7.3 | 3.1 | 0.20 | −2.6 | 4.5 | −1.4 | 4.5 | −1.1 | 2.6 | 0 | 1.3 | 21.4 |
| Ex 9 | 7.3 | 3.2 | 0.20 | −2.6 | 3.4 | −1 | 3.4 | −0.7 | 2.0 | 0.2 | 1.2 | 21.4 |
| Ex 10 | 3.7 | 3.9 | 0.20 | −1.0 | 11.3 | −7.5 | 14.1 | −10.0 | 9.7 | −6.5 | 3.9 | 20 |

As shown in TABLE 2, the laminated window assemblies of Ex 7-Ex 10 may each exhibit a total solar energy transmittance, emissivity, and total visible light transmittance that is similar to those exhibited by the coated glass articles of laminated window assemblies of C1 and C2. However, the laminated window assemblies of Ex 7-Ex 10 each exhibited a total visible light reflectance (Illuminant A, 2 degree observer) of less than 4.0%. In contrast, the laminated window assemblies of C1 and C2 each exhibited a total visible light reflectance (Illuminant A, 2 degree observer) of greater than 10.0%. Also, as illustrated by TABLE 2, as the angle of incidence changes from a normal angle to an oblique angle of incidence and increases, the reflected a* and b* values exhibited by the laminated window assemblies of Ex 7-Ex 9 become more neutral. Ex 10 is particularly advantageous because it ensures that as the angle of incidence changes from a normal angle to an oblique angle of incidence the reflected a* and b* values exhibited by the laminated window assembly remain in the same green/yellow color quadrant (negative a* and positive b*) according to the CIELAB color scale system. This is beneficial because a move to a different quadrant, especially a move from green to red, is very undesirable to observers.

It is also worth noting that the laminated window assemblies of Ex 1-Ex 10, unlike comparative examples, avoid the formation in the coating of aesthetically undesirable laminar flow stripes.

In accordance with the provisions of the patent statutes, the embodiments of the coated glass article have been described in what is considered to represent its preferred embodiments. However, it should be noted that the invention can be practiced otherwise than as specifically illustrated and described without departing from its spirit or scope.

The invention claimed is:

1. A laminated window assembly, comprising:
   a first glass pane having a coating formed thereon, wherein the coating includes
   i. a first layer deposited over a major surface of the glass pane, wherein the first layer has a refractive index of 1.6 or more and a thickness of 50 nm or less,
   ii. a second layer deposited over the first layer, wherein the second layer has a refractive index that is less than the refractive index of the first layer and a thickness of 50 nm or less,
   iii. a third layer deposited over the second layer, wherein the third layer has a refractive index that is greater than the refractive index of the second layer and a thickness of at least 250 nm and less than 500 nm,
   iv. a fourth layer deposited over the third layer, wherein the fourth layer has a refractive index that is less than the refractive index of the third layer and a thickness of 100 nm or less;
   a second glass pane; and
   a polymeric interlayer provided between the first glass pane and the second glass pane.

2. The laminated window assembly according to claim 1, wherein the laminated window assembly is a glazing for a vehicle.

3. The laminated window assembly according to claim 1, wherein the coating is formed directly on a first major surface of the first glass pane.

4. The laminated window assembly according to claim 1, wherein the coating is formed on a first major surface of the first glass pane and wherein an opposing second major surface of the first glass pane is uncoated.

5. The laminated window assembly according to claim 1, wherein the coating consists essentially of the first layer, second layer, third layer, and fourth layer.

6. The laminated window assembly according to claim 1, wherein the coating consists of the first layer, second layer, third layer, and fourth layer.

7. The laminated window assembly according to claim 1, wherein the coating is pyrolytic.

8. The laminated window assembly according to claim 1, wherein the first layer comprises an oxide of tin.

9. The laminated window assembly according to claim 1, wherein the first layer has a thickness of 15-30 nm.

10. The laminated window assembly according to claim 1, wherein the second layer comprises an oxide of silicon.

11. The laminated window assembly according to claim 1, wherein the thickness of the second layer is 10-35 nm.

12. The laminated window assembly according to claim 1, wherein the third layer comprises a transparent conductive metal oxide.

13. The laminated window assembly according to claim 1, wherein the third layer comprises fluorine doped tin oxide ($SnO_2$:F).

14. The laminated window assembly according to claim 1, wherein the third layer has a thickness of at least 290 nm but at most 380 nm.

15. The laminated window assembly according to claim 1, wherein the fourth layer comprises an oxide of silicon.

16. The laminated window assembly according to claim 1, wherein the fourth layer has a thickness of 40-70 nm.

17. The laminated window assembly according to claim 1, wherein the fourth layer forms an outer surface of the coating formed on the first glass pane.

18. The laminated window assembly according to claim 1,
   wherein the second glass pane has a low emissivity coating formed on a first major surface thereof;
   wherein the low emissivity coating is the same as coating formed on first glass pane; or
   the low emissivity coating comprises a first layer deposited over a first major surface of the second glass pane wherein the first layer comprises an oxide of tin, a second layer deposited over the first layer wherein the second layer comprises an oxide of silicon and a third layer deposited over the second layer wherein the third layer comprises fluorine doped tin oxide.

19. The laminated window assembly according to claim 18, wherein an opposing second major surface of the second glass pane defines a first surface of the laminated window assembly, the first major surface of the second glass pane defines a second surface of the laminated window assembly and is located adjacent polymeric interlayer, an opposing second major surface of the first glass pane defines a third surface of the laminated window assembly and is located adjacent polymeric interlayer, and the first major surface of the first glass pane defines a fourth surface of the laminated window assembly.

20. The laminated window assembly according to claim 1, wherein the laminated window assembly exhibits a total visible light reflectance (Illuminant A, 2 degree observer) of 5.0% or less.

* * * * *